(12) United States Patent
Tomita et al.

(10) Patent No.: US 9,278,667 B2
(45) Date of Patent: Mar. 8, 2016

(54) PRETENSIONER, SEAT BELT RETRACTOR, AND SEAT BELT DEVICE

(75) Inventors: Hiroshi Tomita, Tokyo (JP); Yuichiro Hodatsu, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 1017 days.

(21) Appl. No.: 13/137,205

(22) Filed: Jul. 28, 2011

(65) Prior Publication Data

US 2012/0032016 A1  Feb. 9, 2012

(30) Foreign Application Priority Data

Aug. 6, 2010  (JP) .................................. 2010-177567

(51) Int. Cl.
*B60R 22/46* (2006.01)

(52) U.S. Cl.
CPC ..... *B60R 22/4628* (2013.01); *B60R 2022/4642* (2013.01); *Y10T 29/49826* (2015.01)

(58) Field of Classification Search
USPC ........................................................ 242/374
See application file for complete search history.

(56) References Cited

U.S. PATENT DOCUMENTS

| | | | | |
|---|---|---|---|---|
| 6,363,722 B1 * | 4/2002 | Takehara et al. | ................. | 60/632 |
| 6,722,600 B2 * | 4/2004 | Hamaue et al. | ............... | 242/374 |
| 7,089,739 B2 * | 8/2006 | Kameda et al. | ................. | 60/632 |
| 7,631,831 B2 * | 12/2009 | Hiramatsu | .................... | 242/374 |
| 8,366,151 B2 * | 2/2013 | Yokote et al. | ................. | 280/806 |
| 8,720,950 B2 * | 5/2014 | Tomita et al. | ................. | 280/806 |
| 2005/0151364 A1 * | 7/2005 | Kameda et al. | ............... | 280/806 |
| 2011/0062269 A1 * | 3/2011 | Nakaoka et al. | ............... | 242/382 |

FOREIGN PATENT DOCUMENTS

| | | |
|---|---|---|
| JP | 2005-199730 | 7/2005 |
| JP | 2005-306111 | 11/2005 |
| JP | 2006-306148 | 11/2006 |

* cited by examiner

*Primary Examiner* — Emmanuel M Marcelo
*Assistant Examiner* — Angela K Caligiuri
(74) *Attorney, Agent, or Firm* — Manabu Kanesaka

(57) ABSTRACT

A plurality of driving force transmitting members, a piston, a spring and a gas generator are inserted into the pipe from the end of the pipe where the gas generator is mounted. The gas generator is press-fitted in the pipe while the flat faces thereof are deformed by a pair of protrusions of the pipe. Accordingly, the gas generator is temporarily held by the protrusions of the pipe. Then, one end of the pipe is firmly pressed and the gas generator is mounted in the pipe.

9 Claims, 5 Drawing Sheets

PRETENSIONER, SEAT BELT RETRACTOR, AND SEAT BELT DEVICE

BACKGROUND OF THE INVENTION AND RELATED ART STATEMENT

The present invention relates to a pretensioner that increases a force for restraining an occupant with a seat belt by rotating a spool in a belt retracting direction at an early stage of an emergency when a vehicle undergoes a rapid deceleration of a predetermined level or more due to a collision or the like, a seat belt retractor that has such a pretensioner so as to prevent belt withdrawal in the event of an emergency, and a seat belt device that has such a seat belt retractor so as to restrain an occupant with the seat belt in the event of an emergency.

Conventional seat belt devices installed on vehicles such as automobiles, block the inertial movement of an occupant from a seat by restraining the occupant with a seat belt in the event of an emergency as described above. The seat belt device has a seat belt retractor that allows a seat belt to retract and withdraw using a spool and also locks the seat belt by preventing spool rotation in the belt withdrawal direction with a locking mechanism during the emergency.

As such a seat belt retractor, many seat belt retractors having pretensioner have been proposed, wherein the pretensioner increases a force for restraining an occupant with a seat belt by rotating a spool in a belt retracting direction at an early stage of an emergency (for instance, refer to Publications 1 and 2). Each pretensioner described in the Publications 1 and 2 has a gas generator that is activated to generate gas in the event of an emergency; a piston that is activated with the gas so as to generate a driving force; a plurality of balls for transmitting the driving force generated at the piston to a spool of the seat belt retractor for retracting the seat belt; a pipe for guiding the piston and the plurality of balls; and a spring for urging the piston and the plurality of balls in the same direction as the piston's operating direction. In this case, the piston is formed in a ball shape that is the same as that of the plurality of the balls used to transmit the driving force.

Conventionally, pretensioners are generally assembled after mounting a gas generator on one end of a pipe, by sequentially inserting a spring, a piston, and balls into the pipe from the other end of the pipe. In this case, it is proposed that the gas generator is mounted in the pipe by housing the gas generator in a housing portion that has an expanded diameter on one end where the gas generator is mounted and also by press-fitting the one end (for example, see Publication 3). In the mounting method of the gas generator described in the Publication 3, after press-fitting one end, a circular rib is formed at the press-fitted part; the press-fitted portion is reinforced with the circular rib and the gas generator is prevented from moving out of the pipe while gas is being generated.

PUBLICATIONS

Japanese Unexamined Patent Application Publication No. 2006-306148
Japanese Unexamined Patent Application Publication No. 2005-306111
Japanese Unexamined Patent Application Publication No. 2005-199730

Recently, there has been increased demand for compact pretensioners and seat belt retractors. However, since a seat belt needs to be retracted by a certain amount with a pretensioner, it is difficult to reduce the number of balls significantly. Specifically, the pipe that guides a plurality of balls needs to be kept at a certain length. Attempts have been made to reduce the size of a pretensioner and a seat belt retractor as a whole while the pipe is kept at a certain length by three-dimensionally curving the pipe.

On the other hand, the piston is also designed to have a cylindrical or barrel shape, instead of a ball shape, so as to effectively apply the pressure of the gas generated at the gas generator by operating the piston efficiently. By using the three-dimensionally curved pipe and also the piston having a cylindrical or barrel shape, the pretensioner and the seat belt retractor are reduced in size as a whole, and gas pressure is effectively utilized.

However, when the piston is formed in a cylindrical or barrel shape, the piston becomes elongated in its axial direction. Thus, when the piston is inserted into a pipe that is three-dimensionally curved, from the side opposite the mounting side of the gas generator as in the related art, the piston that is long in the axial direction cannot smoothly shift inside the three-dimensionally curved pipe, and the pretensioner cannot be assembled easily.

The balls, piston, spring, and gas generator are inserted into a pipe from one end of the pipe on which the gas generator is mounted, and the gas generator is fitted to the pipe. However, if one end of the pipe is press-fitted after inserting the gas generator into the pipe as in the Publication 3, smooth and stable press-fitting becomes difficult because the urging force of a spring inside the pipe tries to push the gas generator out when press-fitting one end of the pipe. Thus, unfortunately, the mounting of a gas generator is not performed well if the balls, piston, spring and gas generator are sequentially inserted into the pipe from the one end when assembling the pretensioner.

The present invention has been made by considering the aforementioned circumstances and the object thereof is to provide a pretensioner in which a gas generator is smoothly and stably mounted in a pipe even if the driving force transmitting members, piston, spring, and gas generator are inserted into the pipe from the side where the gas generator is mounted; a seat belt retractor having the pretensioner; a seat belt device having the seat belt retractor; and a method for assembling the pretensioner.

Further objects and advantages of the invention will be apparent from the following description of the invention.

SUMMARY OF THE INVENTION

In order to solve the problems described above, the pretensioner relating to the present invention includes a gas generator that generates gas in the event of an emergency; a piston that is activated by the gas from the gas generator so as to generate a driving force; a plurality of force transmitting members that transmit the driving force of the piston to a rotational member for rotating a spool of the seat belt retractor in a belt retracting direction; a pipe in which the gas generator is mounted on one end and in which the piston and the plurality of driving force transmitting members are housed for guiding; and a spring that is arranged between the gas generator and the piston in the pipe and that normally urges the piston and the plurality of force transmitting members toward the rotational member. In such a pretensioner, temporary joining members are provided at the inner periphery of the pipe for temporarily holding the gas generator when the gas generator is mounted in the pipe.

In the pretensioner of the invention, the temporary joining members are protrusions provided at the inner periphery of the pipe.

Moreover, according to the pretensioner of the invention, the gas generator has flat faces, and the protrusions deform the flat faces of the gas generator, temporarily joining the gas generator to the pipe.

Furthermore, in the pretensioner of the invention, the pipe has a flat portion, and the gas generator is positioned with respect to the pipe in a rotational direction by contacting the flat faces of the gas generator with the flat portion of the pipe.

On the other hand, the seat belt retractor of the invention has at least a spool for retracting a seat belt, a locking mechanism that operates in the event of an emergency so as to prevent a spool rotation in a belt withdrawal direction, and a pretensioner that operates in the event of an emergency so as to generate a driving force to rotate the spool in a belt retracting direction. The pretensioner is one of the pretensioners of the invention described above.

Moreover, the seat belt device of the invention has at least a seat belt retractor for retracting a seat belt, a tongue that freely slides along the seat belt withdrawn from the seat belt retractor, and a buckle to which the tongue is detachably latched. The seat belt retractor is one of the inventions described above in the seat belt device that restrains an occupant by preventing the seat belt from being withdrawn with the seat belt retractor in the event of an emergency.

Furthermore, the method for assembling a pretensioner of the invention includes: sequentially inserting a plurality of force transmitting members for transmitting a driving force to a rotational member so as to rotate a spool of a seat belt retractor in a belt retracting direction, a piston generating the driving force, and a spring for urging the plurality of force transmitting members and the piston toward the rotational member; then inserting a gas generator for generating gas in the event of an emergency into the pipe from one end and also temporarily holding the gas generator to the pipe with temporary joining members provided at the pipe; and mounting the gas generator on the pipe by pressing one end of the pipe.

According to the pretensioner and assembly method of the invention, the pipe has temporary joining members for temporarily holding the gas generator to the pipe. Accordingly, it becomes possible to prevent the gas generator from moving out of the pipe even when the urging force of the spring is added to the gas generator in press-fitting the pipe, so as to fix the gas generator to the pipe. Thus, in assembling the pretensioner, the mounting of the gas generator is performed well even if the driving force transmitting member, the piston, the spring and the gas generator are sequentially inserted into the pipe from one end (the end where the gas generator is mounted).

In particular, since the protrusions are provided inside the pipe and used as temporary joining members for the gas generator, the temporary joining members can have a simple structure and can thus be easily formed.

Moreover, the protrusions of the pipe are formed so as to deform a pair of the flat faces provided at the gas generator, so that the flat faces of the gas generator can be effectively deformed with the protrusions. Accordingly, the mounting of the gas generator is performed well.

Furthermore, as the flat faces of the gas generator are in contact with the flat portion of the pipe, the gas generator can be easily positioned relative to the pipe in the rotational direction (circumferential direction) of the gas generator. Thus, the gas generator can be mounted in the pipe more accurately without being displaced in the rotational direction.

According to the pretensioner and seat belt retractor of the invention, the mounting of the gas generator is performed well as described above, so that a piston long in an axial direction, such as a cylindrical or barrel shaped piston, can be used and the pressure of the gas generated at the gas generator can efficiently work on the piston and be effectively used. Thus, the pretensioner and the seat belt retractor can be reduced in size as a whole and gas pressure can be effectively applied by using the three-dimensionally curved pipe and the piston having a cylindrical or barrel shape.

According to the seat belt device having the seat belt retractor of the invention, the gas pressure of the pretensioner can be used effectively, so that an occupant can be better restrained with the seat belt in the event of an emergency.

DETAILED DESCRIPTION OF THE EMBODIMENTS

Figure 1:
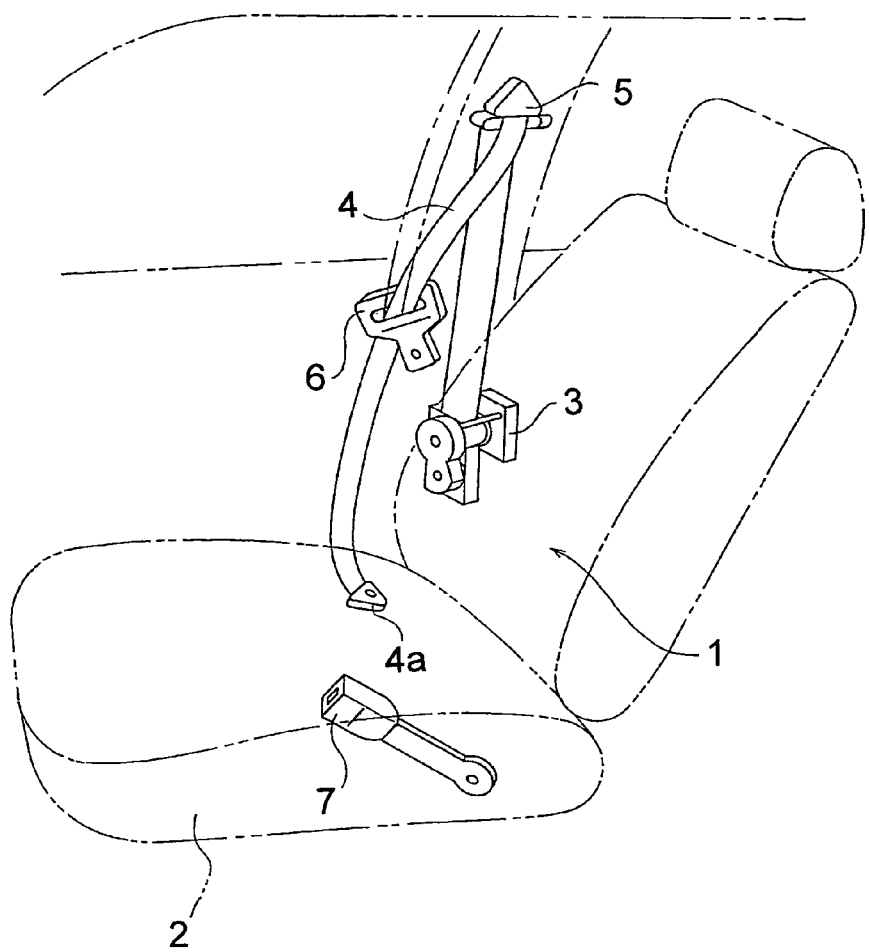
FIG. 1 is a schematic view of a seat belt device having a seat belt retractor, according to an embodiment of the pretensioner of the present invention.

The present invention will be further illustrated with examples by referring to the drawings below.

FIG. 1 is a schematic view of a seat belt device having a seat belt retractor according to an embodiment of the pretensioner of the present invention.

As illustrated in FIG. 1, a seat belt device 1 of this embodiment is basically the same as conventional three-point seat belt devices. The figure shows a seat belt device 1, a vehicle seat 2, a seat belt retractor 3 arranged near the vehicle seat 2, a seat belt 4 that can be withdrawn and retracted into the seat belt retractor 3 and in which a belt anchor 4a at the tip of the belt is fixed to the floor of a car body or the vehicle seat 2, a guide anchor 5 for guiding the seat belt 4 pulled out from the seat belt retractor 3 over the shoulder of an occupant, a tongue 6 supported in a slidable manner along the seat belt 4 guided by the guide anchor 5, and a buckle 7 fixed to the floor of a car body or the vehicle seat and into which the tongue 6 is inserted and engaged in a detachable manner.

The seat belt 4 of the seat belt device 1 is buckled and unbuckled as in conventional seat belt devices.

Figure 2:
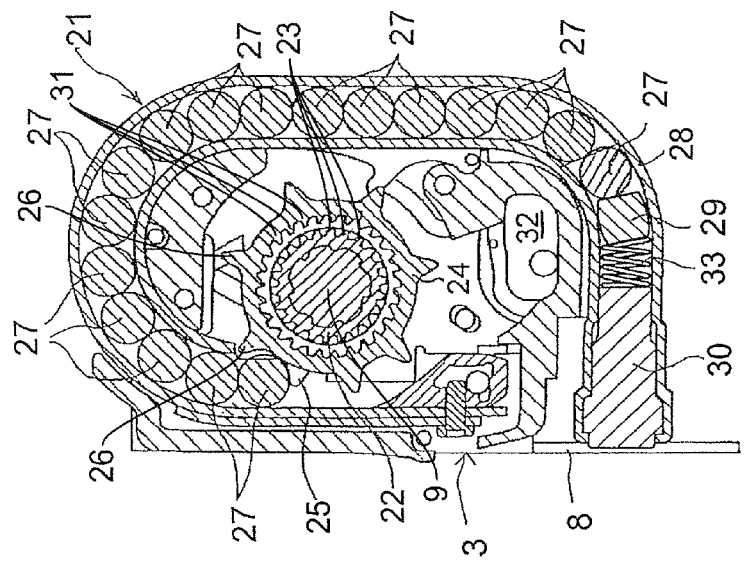
FIG. 2(a) is a longitudinal sectional view of the seat belt retractor of the embodiment.
FIG. 2(b) is a sectional view along the line 2(b)-2(b) of FIG. 2(a).
Figure 2:
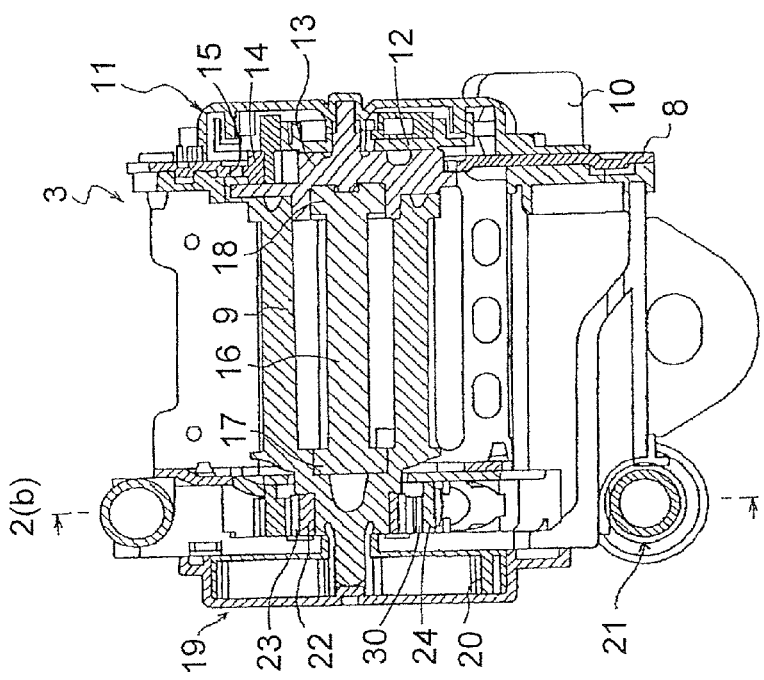

FIG. 2(a) is a longitudinal sectional view of the seat belt retractor of the embodiment; and FIG. 2(b) is a sectional view along the line 2(b)-2(b) of FIG. 2(a). The basic configuration and working of the seat belt retractor 3 of the embodiment are essentially the same as those of the conventional emergency locking type seat belt retractor (ELR) as in the Publication 1. Therefore, the basic configuration and working can be easily understood by referring to the Publication 1 and thus will be briefly explained herein. The detailed explanation thereof will be omitted while explaining the configuration and operation of the seat belt retractor 3 of the embodiment, that are different from those of the seat belt retractor in the Publication 1. Additionally, the seat belt retractor of the invention is not limited to this and may be another conventional ELR or automatic lock type seat belt retractor (ALR).

FIGS. 2(a) and 2(b) show a U-shape frame 8, a spool 9 that is rotatably arranged between both side walls of the U-shape frame 8 so as to retract the seat belt 4, a deceleration sensing unit 10 that operates by sensing a significant deceleration of a vehicle in the event of an emergency as described above, a locking mechanism 11 that is activated by the deceleration sensing means 10 so as to prevent rotation at least in the belt withdrawal direction of the spool 9, a locking gear 12 of the locking mechanism 11, a locking base 13 of the locking mechanism 11, a pawl 14 that is rotatably supported by the locking base, an internal tooth 15 that is formed on the frame so as to catch the pawl 14, a torsion bar 16 that is arranged at the center of the spool 9 in the axial direction and rotatably connects the spool 9 to the locking base 13 of the locking mechanism 11, a first rotational connecting portion 17 that rotates together with the spool 9, a second rotational connecting portion 18 that rotates together with the locking base 13, a spring unit 19 for urging the spool 9 in a belt retracting direction with the spring force of a spiral spring 20, a pretensioner 21 that is activated in the event of an emergency described above so as to generate belt retracting torque, a pinion 22 that is fixed to the spool 9 on the left end of the spool 9 in FIG. 2(a) so as to rotate together at the outer periphery, an external tooth 23 formed at the outer periphery of the pinion 22, a ring gear 24 that is a rotational member offset from the rotary shaft of the spool 9 and is provided so that a portion enters the pipe 28 through a cutout at the tip of the pipe 28, levers 25 and 26 provided in a protruding manner at the outer periphery of the ring gear 24, a plurality of driving force transmitting members 27 that are metallic balls or the like arranged inside the pipe 28 in a moveable and mutually contactable manner, a metallic piston 29 provided inside the pipe 28 in a moveable manner and that receives the gas pressure of reactant gas, a gas generator 30, internal teeth 31 formed at the inner periphery of the ring gear 24, a housing portion 32 that is provided at the tip of the pipe 28 so as to house the driving force transmitting members 27 popping out of the pipe 28, and a spring 33 for urging the piston 29 so as to push each ball 27 towards the end of the pipe 28 opposite the gas generator 30.

As described in the Publications 1 and 2, conventional pistons are constituted by balls, but the piston 29 has a barrel shape in the pretensioner 21 of the embodiment. Specifically, the piston 29 has a curved outer peripheral side face having its maximum diameter at the center in the axial direction of the piston 29 and minimum diameters at both ends in the axial direction of the piston 29 as shown in FIG. 2(b). Moreover, both ends in the axial direction of the piston 29 are flat. Thus, the end of the piston 29 on the side of the gas generator 30 constitutes a pressure receiving surface that receives the pressure of the gas from the gas generator 30. The piston 29 is not limited to this shape, and may have a conventional shape such as that of a ball. In the pretensioner 21 of the embodiment, the pipe 28 is arranged as if two-dimensionally wound in the frame 8. In addition to the two-dimensional configuration, the pipe 28 may also be curved and wound in three dimensions in the frame 8.

As illustrated in FIGS. 3(a) and 3(b) and FIGS. 4(a) and 4(b), one end of the pipe 28 on which the gas generator 30 is mounted (the end where the gas generator is mounted), has a large diameter portion 28a, a medium diameter portion 28b and a small diameter portion 28c sequentially from the one end of the pipe 28. A step 28d is formed between the large diameter portion 28a and the medium diameter portion 28b. The medium diameter portion 28b has a pair of flat portions 28e and 28f that are parallel or roughly parallel to each other. The outer periphery and inner periphery of the pipe 28 at a pair of the flat portions 28e and 28f are both flat.

Moreover, each flat portion 28e, 28f has a rib-like protrusion 28g, 28h (equivalent to temporary joining members of the invention) that protrudes inwardly, at the flat inner periphery of the flat portions. The end faces 28i, 28j of the corresponding protrusions 28g, 28h on one end of the pipe 28 are inclined inward toward the inside of the pipe 28 as inclined faces. These protrusions 28g, 28h temporarily hold the gas generator 30 that is inserted into the pipe 28.

Figure 3:
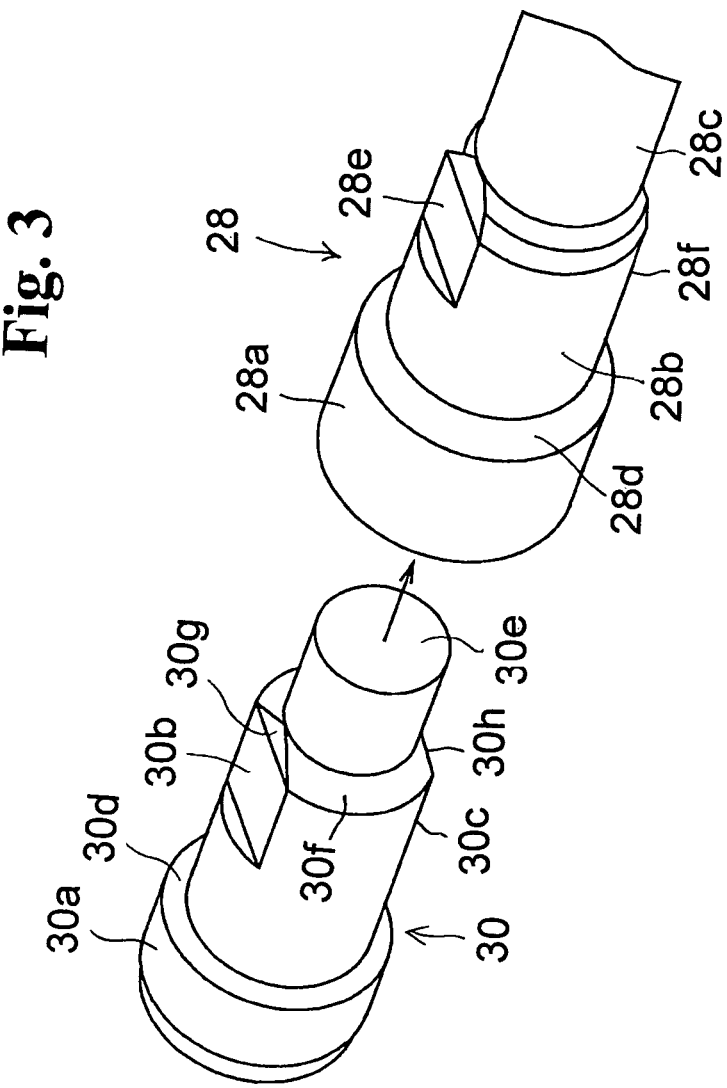
FIG. 3 is a perspective view, illustrating a gas generator and one end of a pipe on which the gas generator is mounted.
Figure 4:
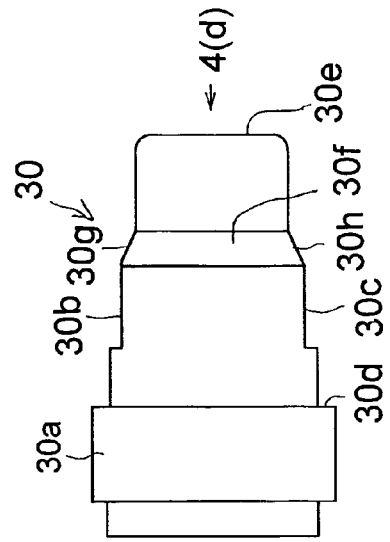
FIG. 4(a) is a sectional view along a longitudinal direction of one end of the pipe.
FIG. 4(b) is a sectional view taken along 4(b)-4(b) of FIG. 4(a)
FIG. 4(c) is a front view of the gas generator.
FIG. 4(d) is a diagram illustrating the gas generator seen from a direction 4(d) in FIG. 4(c).
Figure 4:
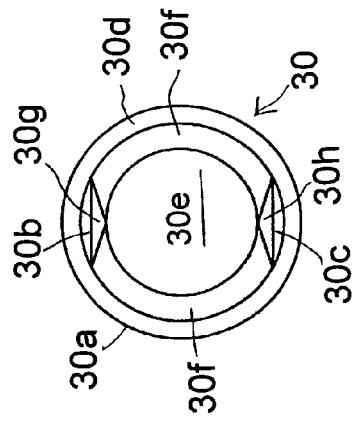
Figure 4:
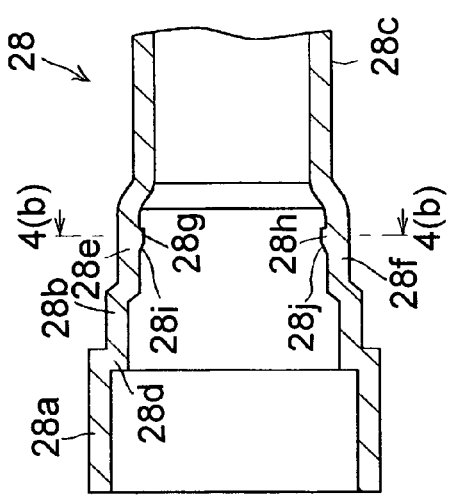
Figure 4:
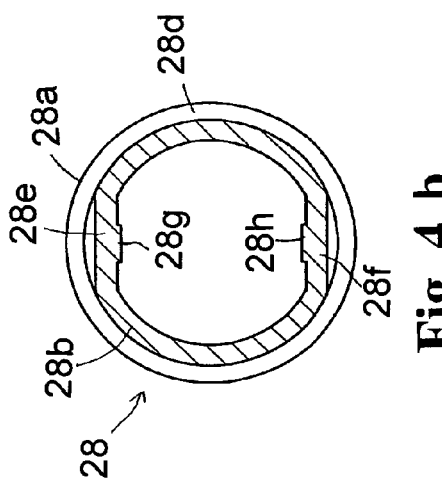

As shown in FIG. 3 and FIGS. 4(c) and 4(d), the outer periphery of the gas generator 30 has a circular mounting flange portion 30a that protrudes outward, and a pair of flat faces 30b, 30c that are parallel or nearly parallel to each other. Then, the pair of flat faces 30b, 30c are made flush with the pair of flat portions 28e, 28g with almost no gap therebetween by inserting the gas generator 30 into the pipe 28 from one end thereof while aligning the pair of flat faces 30b, 30c of the gas generator 30 with the pair of flat portions 28e, 28f of the pipe 28. By inserting the gas generator 30 further into the pipe 28, one side edge 30d of the mounting flange portion 30a comes in contact with a step 28d of the pipe 28. Thus, the pair of flat faces 30b, 30c are made flush with the pair of flat portions 28e, 28f, so that the pair of flat, faces 30b, 30c come in contact with the pair of flat portions 28e, 28f when the gas generator 30 rotates relative to the pipe 28, and the gas generator 30 is positioned in a rotational direction (circumferential direction) relative to the pipe 28. Specifically, the rotational direction of the gas generator 30 is controlled relative to the pipe 28.

The end opposite the flange portion 30a of the gas generator 30 is a gas jetting end 30e. The gas generator 30 also has an outer periphery 30f that is adjacent to each flat face 30b, 30c on the gas jetting end 30e and has a truncated cone shape. Flat faces 30g, 30h are formed adjacent to the flat faces 30b, 30c of the truncated cone-shaped outer periphery 30f and are inclined toward the inside (the center in the radial direction) of the gas generator 30.

The assembly method of the pretensioner 21 will now be explained.

First, a certain number of the power transmitting members 27, the piston 29 and the spring 33 are sequentially inserted into the pipe 28 from one end. Then, the gas generator 30 is inserted into the pipe 28 from one end so as to set the gas jetting end 30e in the front as in FIG. 5(a). In this case, the pair of flat faces 30b, 30c of the gas generator 30 is positioned (aligned) in the circumferential direction so as to face the pair of flat portions 28e, 28f of the pipe 28, and the gas generator 3 is then inserted into the pipe 28. The gas generator 30 is inserted into the pipe 28 until the inclined flat faces 30g, 30h of the gas generator 30 come in contact with the inclined end faces 28i, 28j of the protrusions 28g, 28h of the pipe 28. At this point, one side edge 30d of the mounting flange portion 30a is not still in contact with the step 28d of the pipe 28.

Figure 5:
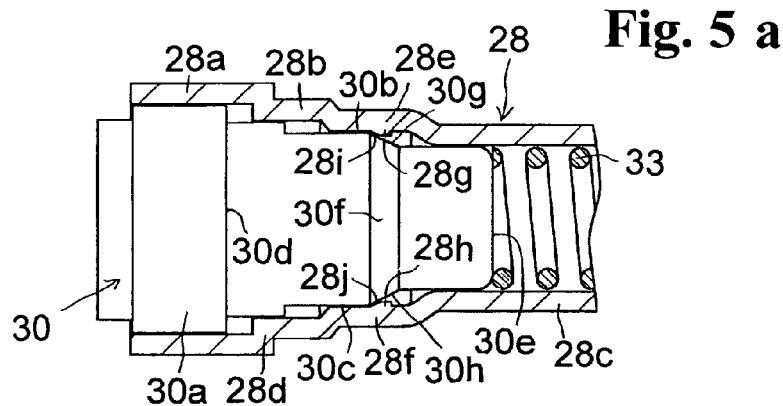
FIGS. 5(a) to 5(d) are diagrams for explaining a method of mounting the gas generator on the pipe.
Figure 5:
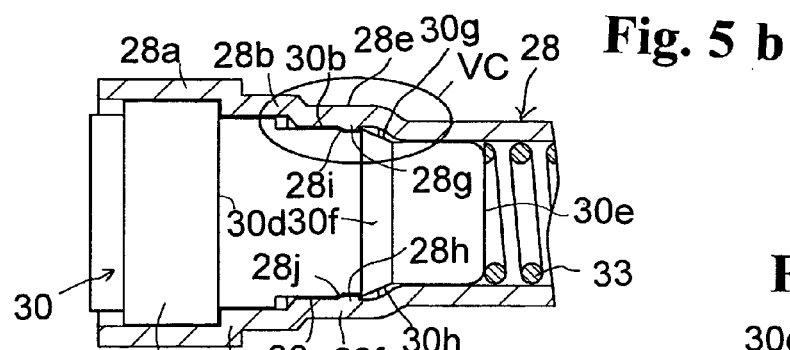
Figure 5:
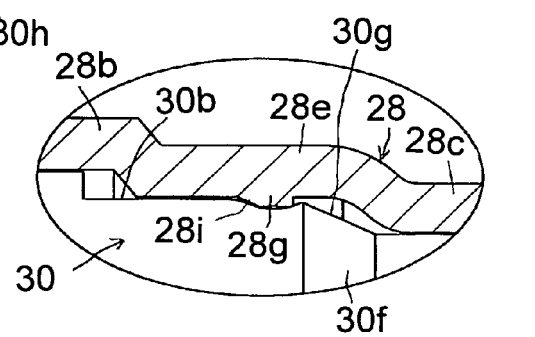
Figure 5:
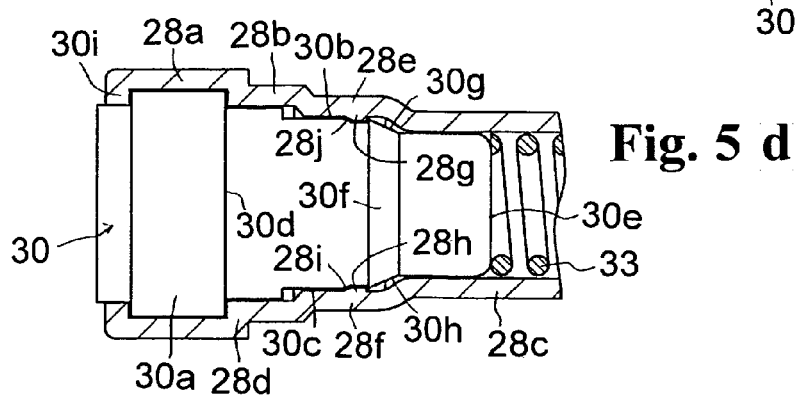

When the gas generator 30 is inserted further, the gas generator 30 is press-fitted while receiving resistance from the pair of protrusions 28g, 28h of the pipe 28 as in FIG. 5(b). The flat face 30b of the gas generator 30 is dented and deformed by the protrusion 28g of the pipe 28 as in FIG. 5(c). In this case, the gas generator 30 is smoothly press-fitted and easily deformed due to the inclined flat faces 30g, 30h of the gas generator 30 and the inclined end faces 28i, 28j of the protrusions 28g, 28h of the pipe 28. Although not illustrated, the flat face 30c of the gas generator 30 is also slightly dented and deformed by the protrusion 28h of the pipe 28. Then, the gas generator 30 is press-fitted until the one side edge 30d of the mounting flange portion 30a contacts the step 28.d of the pipe 28. Subsequently, the pressing force applied to the gas generator 30 so as to insert the generator into the pipe 28 is released. The gas generator 30 is press-fitted while receiving resistance from the pair of protrusions 28g, 28h in this condition, so that the gas generator is temporarily held by the protrusions 28g, 28h. Accordingly, the gas generator 30 is prevented from moving out of the pipe 28 even if the generator receives the urging force of the spring 33. Finally, one end of the pipe 28 is pressed, and the flange portion 30a of the gas generator 30 is compressed between the step 30d and a press-fitting portion 30i, so that the gas generator 30 is mounted in the pipe 28 as in FIG. 5(d).

Other configurations of the pretensioner 21 and the seat belt retractor 3 of the embodiment are the same as those of the pretensioner and the seat belt retractor described in the Publication 1.

According to the pretensioner 21 and the assembly method of the embodiment, the inner periphery of the pipe 28 has the pair of protrusions 28g, 28h as temporary joining members for temporarily holding the gas generator 30. The protrusions can prevent the gas generator 30 from moving out by the urging force of the spring 33 when the pipe 28 is press-fitted so as to mount the gas generator 30 on the pipe 28. Accordingly, the gas generator 30 can be smoothly and stably mounted in the pipe 28. Thus, even if each driving force transmitting member 27, the piston 29, the spring 33 and the gas generator 30 are sequentially inserted into the pipe 28 from one end during assembly of the pretensioner 21, the gas generator 30 can be well mounted.

In particular, since the protrusions 28g, 28h are provided inside the pipe 28 as the temporary joining members for the gas generator 30, the temporary joining members may have a simple structure and can be easily formed.

Moreover, as the pair of flat faces 30b, 30c of the gas generator 30 is press-fitted by the pair of protrusions 28g, 28h of the pipe 28, the pair of flat faces 30b, 30c can be effectively deformed by the protrusions 28g, 28h. Accordingly, the gas generator is held better.

Furthermore, the pair of flat faces 30b, 30c of the gas generator 30 is made flush with the pair of flat portions 28e, 28f of the pipe 28, and the gas generator 30 can be easily positioned in the rotational direction (circumferential direction) relative to the pipe 28. Accordingly, the gas generator 30 can be mounted in the pipe 28 more accurately without displacement in the rotational direction.

According to the pretensioner 21 and the seat belt retractor 3 of the embodiment, the gas generator 30 is held well as described above, so that the piston 27 that is long in the axial direction and that has, for example, a cylindrical or barrel shape, can be used, and the pressure of the gas generated at the gas generator 30 can be efficiently activated and used. Accordingly, the pretensioner 21 and the seat belt retractor 3 are reduced in size as a whole, and gas pressure can also be effectively used by employing the curved pipe 28 and the cylindrical or barrel piston 27 in the pretensioner 21 of the embodiment. In particular, when the three-dimensionally curved pipe 28 is used, it becomes possible to decrease the size of the pretensioner 21 and the seat belt retractor 3 as a whole and also effectively use gas pressure.

Furthermore, according to the seat belt device 1 of the embodiment, the gas pressure of the pretensioner 21 can be effectively used so that an occupant can be restrained with the seat belt 4 more efficiently in the event of an emergency.

The other effects of the pretensioner 21, the seat belt retractor 3 and the seat belt device 1 of the embodiment are the same as those of the pretensioner, the seat belt retractor and the seat belt device as in the Publication 1.

The present invention is not limited to the embodiment described above, and various modifications of the design are acceptable. For example, the protrusions 28g, 28h may be provided not at the flat portions 28e, 28f but at the large diameter portion 28a as the temporary joining members. In this case, the flange portion 30a of the gas generator 30 can also be deformed. Additionally, the flat portions 28e, 28f may be provided at the small diameter portion 28c. In this case, the gas generator 30 is positioned in the rotational direction at the small diameter portion 28c of the pipe 28. Specifically, various changes in design are possible within the range of technical matters described in the claims of the present invention.

The pretensioner, seat belt retractor, seat belt device and assembly method for the pretensioner relating to the present invention are suitably applicable to a pretensioner that rotates a spool in a belt retracting direction so as to restrain an occupant with the seat belt in the event of an emergency when a vehicle experiences significant deceleration of a certain level or more due to a collision or the like; a seat belt retractor having the pretensioner; a seat belt device that has the seat belt retractor so as to restrain an occupant by preventing the seat belt from being withdrawn in the event of an emergency; and the method for assembling the pretensioner.

The disclosure of Japanese Patent Application No. 2010-177567 filed on Aug. 6, 2010 is incorporated herein. Also, the disclosures of Japanese Patent Publications explained in the specification are incorporated as references.

What is claimed is:

1. A pretensioner, comprising:
a gas generator for generating gas in an event of an emergency;
a piston activated with the gas generated by the gas generator so as to generate driving force;
a plurality of force transmitting members for transmitting the driving force from the piston to a rotational member so as to rotate a spool of a seat belt retractor in a belt retracting direction;
a pipe having a press-fitting portion formed on one end thereof to mount the gas generator, and guiding and housing the piston and the plurality of force transmitting members; and
a spring arranged between the gas generator and the piston in the pipe and urging the piston and the plurality of force transmitting members toward the rotational member;
wherein the pipe has an inner circumferential face, and a temporary joining member formed on the inner circumferential face,
the temporary joining member is a protrusion protruding inwardly from a part of the inner circumferential face between the press-fitting portion and the spring and forming an inner diameter of the pipe thereat, said inner diameter being less than an outer diameter of the gas generator at a position corresponding thereto so that the temporary joining member temporarily holds the gas generator when mounting the gas generator in the pipe, and
the protrusion has an inclined face inclined inwardly in a direction from the press-fitting portion toward the spring such that the gas generator is press-fitted when the gas generator is mounted in the pipe.

2. The pretensioner according to claim 1, wherein the gas generator has a flat face at a side portion contacting the protrusion, and the protrusion deforms the flat face of the gas generator so as to temporarily hold the gas generator in the pipe.

3. The pretensioner according to claim 2, wherein the pipe has a flat portion at a side portion adjacent to the protrusion, and the gas generator is positioned relative to the pipe in a rotational direction by contacting the flat face of the gas generator with the flat portion of the pipe.

4. The seat belt retractor, comprising:
the spool for retracting a seat belt;
a locking mechanism activated in the event of the emergency so as to prevent rotation of the spool in a belt withdrawal direction; and
the pretensioner according to claim 1, the pretensioner being activated in the event of the emergency so as to generate the driving force for rotating the spool in the belt retracting direction.

5. A seat belt device, comprising:
the seat belt retractor according to claim 4, the seat belt retractor retracting the seat belt;
a tongue slidably supported along the seat belt withdrawn from the seat belt retractor; and
a buckle to which the tongue is detachably latched, wherein the seat belt retractor prevents withdrawal of the seat belt in the event of the emergency so as to restrain an occupant.

6. The pretensioner according to claim 1, wherein the temporary joining member is a pair of protrusions projecting radially inwardly from the part of the inner circumferential face of the pipe to face each other, and the gas generator has a pair of flat portions formed at side portions thereof facing outwardly in opposite directions so that the pair of protrusions engage the pair of flat portions.

7. A pretensioner, comprising:
a gas generator for generating gas in an event of an emergency;
a piston activated with the gas generated by the gas generator so as to generate driving force;
a plurality of force transmitting members for transmitting the driving force from the piston to a rotational member so as to rotate a spool of a seat belt retractor in a belt retracting direction;
a pipe having a press-fitting portion formed on one end thereof to mount the gas generator, and guiding and housing the piston and the plurality of force transmitting members; and
a spring arranged between the gas generator and the piston in the pipe and urging the piston and the plurality of force transmitting members toward the rotational member;
wherein the pipe has an inner circumferential face, and a temporary joining member formed in the inner circumferential face,
the temporary joining member is a protrusion provided on the inner circumferential face of the pipe between the press-fitting portion and the spring and forming an inner diameter of the pipe thereat, said inner diameter being less than an outer diameter of the gas generator so that the temporary joining member temporarily holds the gas generator when mounting the gas generator in the pipe,
the gas generator has a flat face at a side portion contacting the protrusion, and the protrusion deforms the flat face of the gas generator so as to temporarily hold the gas generator in the pipe,
the pipe has a flat portion at a side portion adjacent to the protrusion, and the gas generator is positioned relative to the pipe in a rotational direction by contacting the flat face of the gas generator with the flat portion of the pipe, and
the gas generator includes: a gas jetting end formed at a front end of the gas generator; a mounting flange portion formed at a rear end of the gas generator to abut against the press-fitting portion of the pipe; and the side portion arranged between the gas jetting end and the mounting flange portion of the gas generator and having a truncated cone-shape portion with respect to the gas jetting end, the side portion of the gas generator having the flat face engaging the side portion of the pipe.

8. The pretensioner according to claim 7, wherein the pipe includes:
a small diameter portion for housing the spring, the piston, and the plurality of force transmitting members;
a large diameter portion arranged at the one end of the pipe and having the press-fitting portion; and
a medium diameter portion arranged between the small diameter portion and the large diameter portion and having the flat portion.

9. A pretensioner, comprising:
a gas generator for generating gas in an event of an emergency, having a pair of flat surfaces formed at side portions thereof facing outwardly in opposite directions;
a piston activated with the gas generated by the gas generator so as to generate driving force;
a plurality of force transmitting members for transmitting the driving force from the piston to a rotational member so as to rotate a spool of a seat belt retractor in a belt retracting direction;
a pipe having a press-fitting portion formed on one end thereof to mount the gas generator, guiding and housing the piston and the plurality of force transmitting members; and
a spring arranged between the gas generator and the piston in the pipe and urging the piston and the plurality of force transmitting members toward the rotational member;
wherein the pipe has an inner circumferential face, a pair of flat surfaces formed on the inner circumferential face to face each other and engaging the pair of flat surfaces of the gas generator, and temporary joining members protruding inwardly from the pair of flat surfaces of the pipe between the press-fitting portion and the spring, the temporary joining members temporarily holding the gas generator when mounting the gas generator in the pipe, and
each of the temporary joining members has an inclined face inclined inwardly in a direction from the press-fitting portion toward the spring such that the gas generator is press-fitted when the gas generator is mounted in the pipe.

* * * * *